US012811064B2

(12) United States Patent
Kim et al.

(10) Patent No.: US 12,811,064 B2
(45) Date of Patent: Nov. 24, 2026

(54) MULTILAYER ELECTRONIC COMPONENT

(71) Applicant: SAMSUNG ELECTRO-MECHANICS CO., LTD., Suwon-si (KR)

(72) Inventors: Hyun Tak Kim, Suwon-si (KR); Hyung Jong Choi, Suwon-si (KR); Young Bin Jeong, Suwon-si (KR); Chung Eun Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 247 days.

(21) Appl. No.: 18/822,951

(22) Filed: Sep. 3, 2024

(65) Prior Publication Data

US 2025/0157738 A1 May 15, 2025

(30) Foreign Application Priority Data

Nov. 10, 2023 (KR) ........................ 10-2023-0154964

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ............................... H01G 4/2325; H01G 4/30
See application file for complete search history.

(56) References Cited

U.S. PATENT DOCUMENTS

2002/0046861 A1* 4/2002 Yokoyama ............. H01G 4/232 174/565
2018/0166215 A1* 6/2018 Hamanaka ............... H01G 2/06
2020/0135403 A1 4/2020 Lee et al.
2021/0057153 A1 2/2021 Jun et al.
2022/0189696 A1* 6/2022 Yi ........................ H01G 4/1209
2023/0019604 A1 1/2023 Uchida et al.
2023/0207205 A1* 6/2023 Oh ....................... H01G 4/2325 361/301.4
2023/0207207 A1 6/2023 Choi et al.

FOREIGN PATENT DOCUMENTS

JP 2023-9629 A 1/2023
KR 10-2019-0116158 A 10/2019

OTHER PUBLICATIONS

Extended European Search Report issued in corresponding European Application No. 24196674.6 dated Aug. 6, 2025.

* cited by examiner

*Primary Examiner* — Michael P McFadden
(74) *Attorney, Agent, or Firm* — Morgan, Lewis & Bockius LLP

(57) ABSTRACT

A multilayer electronic component includes: a body including a dielectric layer and internal electrodes alternately disposed while having the dielectric layer interposed therebetween; and external electrodes disposed on the body, wherein the external electrodes include a lower electrode layer including copper (Cu) and glass, an intermediate electrode layer including copper (Cu) and disposed on the lower electrode layer, and an upper electrode layer including silver (Ag) and glass and disposed on the intermediate electrode layer, and an area fraction occupied by a pore in the intermediate electrode layer is smaller than an area fraction occupied by a pore in the lower electrode layer.

30 Claims, 7 Drawing Sheets

K1

MULTILAYER ELECTRONIC COMPONENT

CROSS-REFERENCE TO RELATED APPLICATION(S)

This application claims benefit of priority to Korean Patent Application No. 10-2023-0154964 filed on Nov. 10, 2023 in the Korean Intellectual Property Office, the disclosure of which is incorporated herein by reference in its entirety.

BACKGROUND

1. Technical Field

The present disclosure relates to a multilayer electronic component.

2. Description of the Related Art

A multilayer ceramic capacitor (MLCC), one of multilayer electronic components, may be a chip-type condenser which is mounted on a printed circuit board of any of various electronic products, such as an imaging device such as a liquid crystal display (LCD) or a plasma display panel (PDP), a computer, a smartphone, or a mobile phone, to serve to charge or discharge electricity therein or therefrom. The MLCC may be used as a component of any of various electronic apparatuses because the MLCC is small, has high capacity, and is easily mounted.

In recent years, an external electrode is being thinned to miniaturize the MLCC. However, as the external electrode becomes thinner, external moisture or plating solution may easily penetrate into a capacitor body. In general, the external electrode may be formed by a dipping method. However, the external electrode formed by the dipping method may not have a constant thickness, and the external moisture or plating solution may penetrate into the body through a thin portion of the body.

Accordingly, there is a need for research on a structure of the external electrode for preventing lower moisture resistance reliability of the MLCC by blocking a moisture penetration path shortened by the thinner external electrode.

SUMMARY

An aspect of the present disclosure is to provide a multilayer electronic component having improved moisture resistance reliability.

However, the present disclosure is not limited to the description described above, and may be more readily understood in the description of exemplary embodiments of the present disclosure.

According to an aspect of the present disclosure, a multilayer electronic component includes: a body including a dielectric layer and internal electrodes alternately disposed while having the dielectric layer interposed therebetween; and external electrodes disposed on the body, wherein the external electrodes include a lower electrode layer including copper (Cu) and glass, an intermediate electrode layer including copper (Cu) and disposed on the lower electrode layer, and an upper electrode layer including silver (Ag) and glass and disposed on the intermediate electrode layer, and an area fraction occupied by a pore in the intermediate electrode layer is smaller than an area fraction occupied by a pore in the lower electrode layer.

According to an aspect of the present disclosure, a multilayer electronic component includes: a body including a dielectric layer and internal electrodes alternately disposed while having the dielectric layer interposed therebetween; and external electrodes disposed on the body, wherein the external electrodes include a lower electrode layer including copper (Cu) and glass, an intermediate electrode layer including copper (Cu) and disposed on the lower electrode layer, and an upper electrode layer including silver (Ag) and glass and disposed on the intermediate electrode layer, and the intermediate electrode layer is a plating layer or a sputtering layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
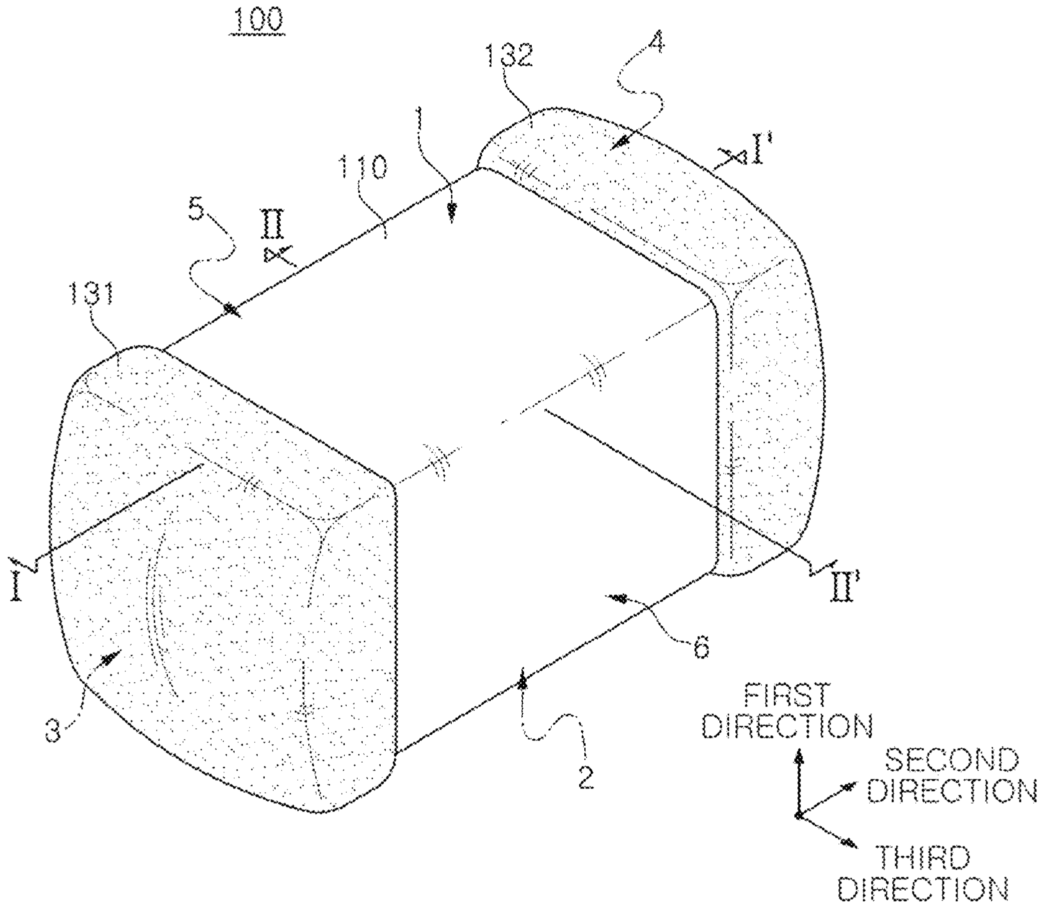
FIG. 1 is perspective view schematically a illustrating a multilayer electronic component according to an exemplary embodiment of the present disclosure.

Hereinafter, exemplary embodiments of the present disclosure will now be described in detail with reference to the accompanying drawings. The exemplary embodiments of the present disclosure may be modified in many different forms and the scope of the present disclosure should not be limited to the exemplary embodiments set forth herein. In addition, the exemplary embodiments of the present disclosure are provided to more fully explain the present disclosure to those skilled in the art. In the drawings, the shapes and dimensions may thus be exaggerated for clarity, and the same reference numerals are used to designate the same or like components.

Further, in the accompanying drawings, portions unrelated to the description will be omitted in order to clearly describe the present disclosure, and the size and thickness of each component shown in the drawings are arbitrarily shown for convenience of explanation. Therefore, the present disclosure is not necessarily limited to contents shown in the drawings. Furthermore, like reference numerals will be used to designate like components having similar functions throughout the drawings within the scope of the present disclosure. In addition, throughout the specification, when an element "includes" another component, it is to be understood that the element may further include a third component rather than excluding the third component, unless explicitly described to the contrary.

In the drawings, a first direction may indicate a thickness (T) direction, a second direction may indicate a length (L) direction, and a third direction may indicate a width (W) direction.

Multilayer Electronic Component

FIG. 1 is a perspective view schematically illustrating a multilayer electronic component according to an exemplary embodiment of the present disclosure.

Figure 2:
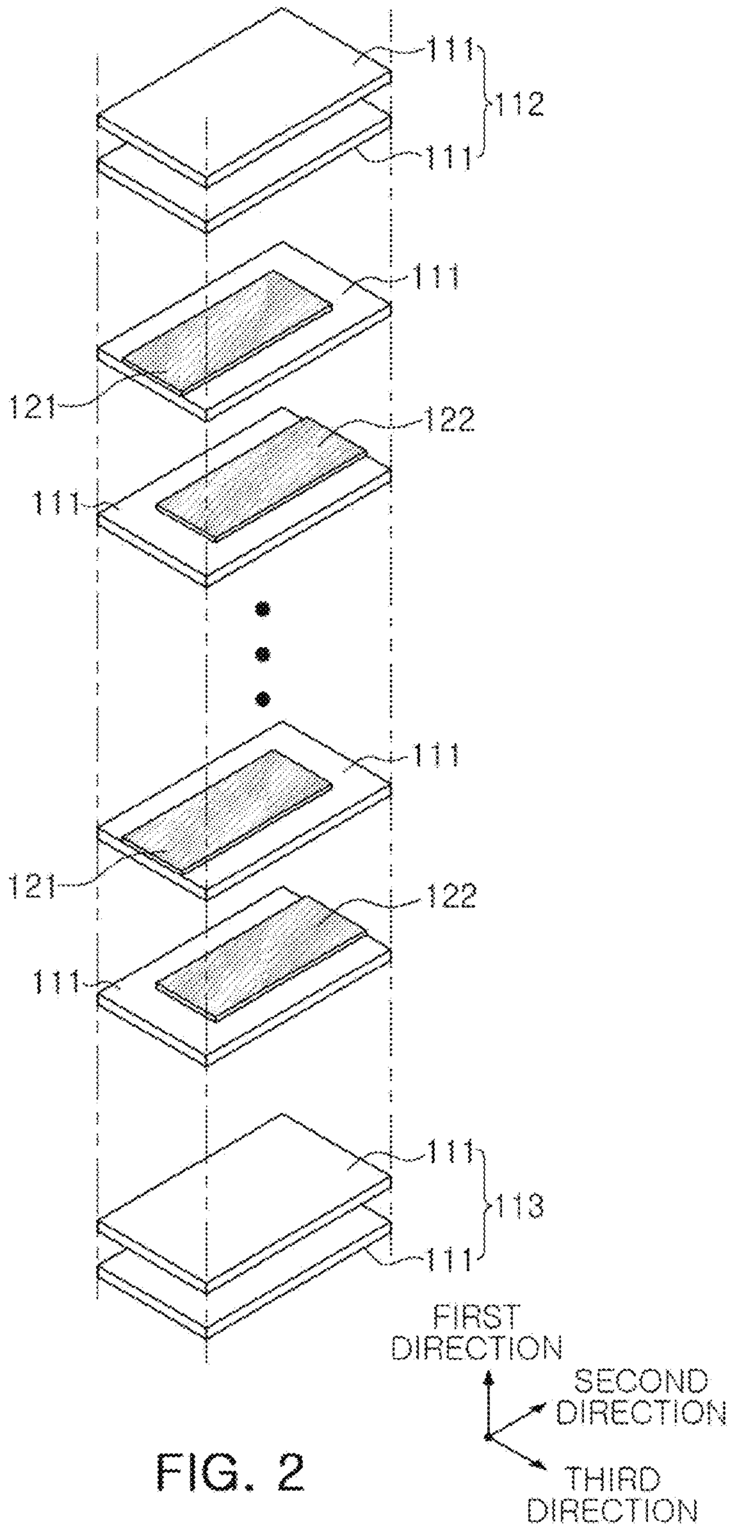
FIG. 2 is an exploded perspective view schematically illustrating a body of FIG. 1.

FIG. 2 is an exploded perspective view schematically illustrating a body of FIG. 1.

Figure 3:
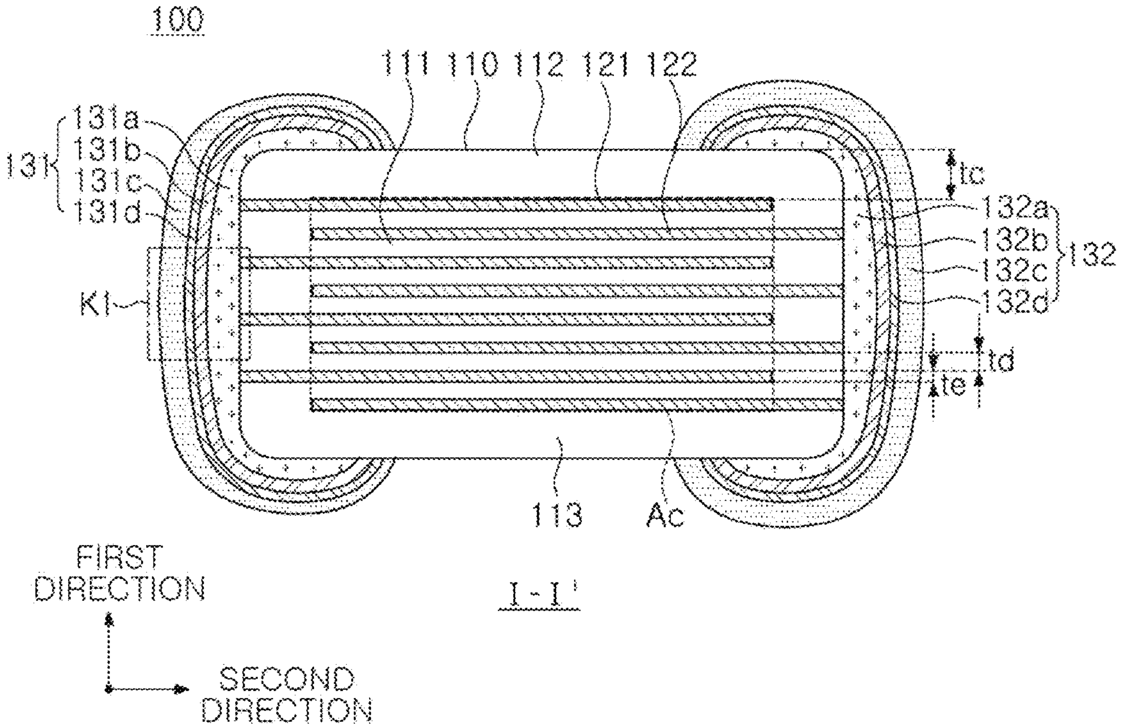
FIG. 3 is a cross-sectional view schematically illustrating section I-I' in FIG. 1.

FIG. 3 is a cross-sectional view schematically illustrating section I-I' in FIG. 1.

Figure 4:
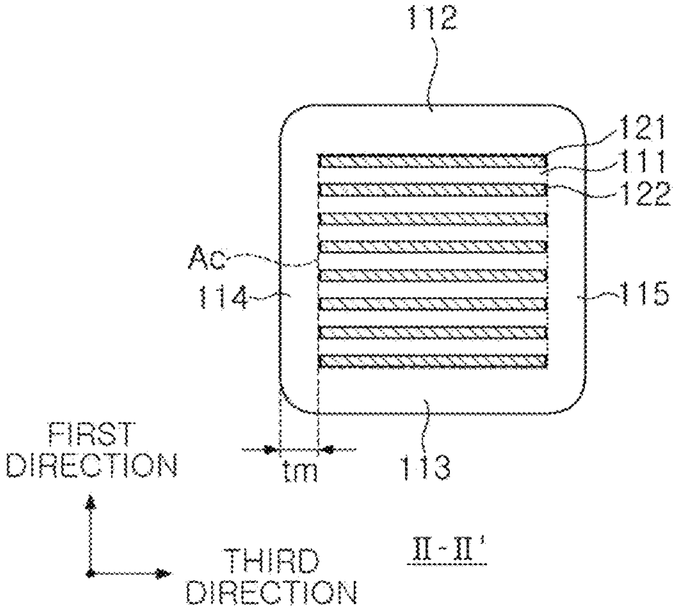
FIG. 4 is a cross-sectional view schematically illustrating section II-II' in FIG. 1.

FIG. 4 is a cross-sectional view schematically illustrating section II-II' in FIG. 1.

Figure 5:
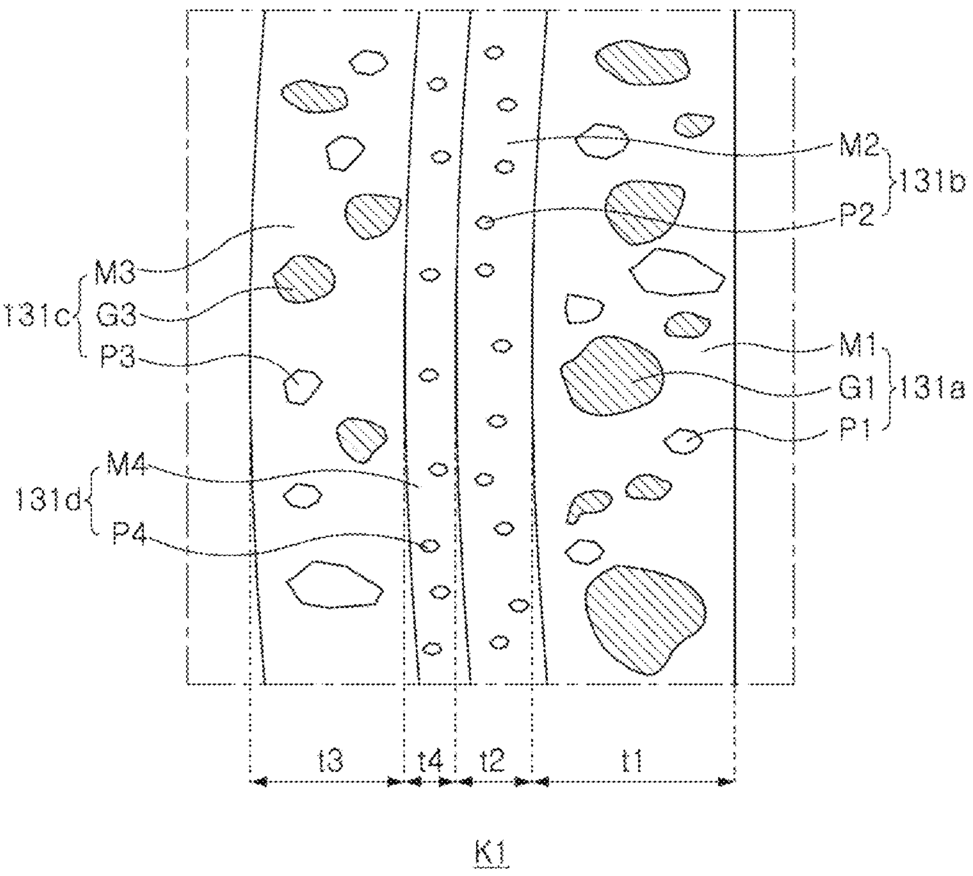
FIG. 5 is an enlarged view of region K1 in FIG. 3.

FIG. 5 is an enlarged view of region K1 in FIG. 3.

Hereinafter, a multilayer electronic component 100 according to an exemplary embodiment of the present disclosure is described with reference to FIGS. 1 through 5. In addition, a multilayer ceramic capacitor (MLCC) is described as an example of the multilayer electronic component, is not limited thereto, and may be applied to various multilayer electronic components, for example, an inductor, a piezoelectric element, a varistor, or a thermistor.

A multilayer electronic component 100 according to an exemplary embodiment of the present disclosure may include a body 110 including a dielectric layer 111 and internal electrodes 121 and 122, and external electrodes 132 and 132 disposed on the body 110.

The body 110 is not particularly limited to a specific shape, and may have a hexahedral shape or a shape similar to the hexahedral shape, as shown in the drawings. The body 110 may not have a shape of the hexahedron having perfectly straight lines because a ceramic powder included in the body 110 is contracted during sintering process or edges of the body 110 may be polished. However, the body 110 may substantially have the hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4, and opposing each other in the third direction.

The body 110 may include the dielectric layer 111 and the internal electrodes 121 and 122 alternately disposed while having the dielectric layer 111 interposed therebetween. The plurality of dielectric layers 111 included in the body 110 may already be sintered, and the adjacent dielectric layers 111 may thus be integrated with each other, thus making it difficult to confirm a boundary therebetween without using a scanning electron microscope (SEM).

The dielectric layer 111 may be formed by preparing a ceramic slurry including the ceramic powder, an organic solvent and a binder, applying the slurry on a carrier film and drying the same to prepare a ceramic green sheet, and then sintering the ceramic green sheet. The ceramic powder is not particularly limited as long as the capacitor acquires sufficient capacitance, and may use, for example, a barium titanate-based material, a lead composite perovskite-based material, or a strontium titanate-based material. The ceramic powder may be, for example, barium titanate ($BaTiO_3$) or $(Ba_{1-x}Ca_x)TiO_3$ $(0<x<1)$, $Ba(Ti_{1-y}Ca_y)O_3$ $(0<x<1)$, $(Ba_{1-x}Ca_x)(Ti_{1-y}Zr_y)O_3$ $(0<x<1, 0<x<1)$ or $Ba(Ti_{1-y}Zr_y)O_3$ $(0<x<1)$, in which calcium (Ca), zirconium (Zr) or the like is partially dissolved in $BaTiO_3$. The organic solvent may use ethanol or the like, the binder may use polyvinyl butyral or the like, and the organic solvent and the binder may use known materials used in the art.

The internal electrodes 121 and 122 may include, for example, the first internal electrode 121 and the second internal electrode 122 alternately disposed in the first direction while having the dielectric layer 111 interposed therebetween. That is, the first internal electrode 121 and the second internal electrode 122, which is a pair of electrodes having different polarities, may oppose each other while having the dielectric layer 111 interposed therebetween. The first internal electrode 121 and the second internal electrode 122 may be electrically insulated from each other by the dielectric layer 111 disposed therebetween.

The first internal electrode 121 may be spaced apart from the fourth surface 4 and may be connected to the first external electrode 131 on the third surface 3. The second internal electrode 122 may be spaced apart from the third surface 3 and may be connected to the second external electrode 132 on the fourth surface 4.

A conductive metal included in the internal electrode 121 or 122 may be at least one of nickel (Ni), copper (Cu), palladium (Pd), silver (Ag), gold (Au), platinum (Pt), tin (Sn), tungsten (W), titanium (Ti) and an alloy thereof, may include nickel (Ni), and is not limited thereto.

The internal electrode 121 or 122 may be formed by applying a conductive paste for an internal electrode that includes the conductive metal to a predetermined thickness on the ceramic green sheet and sintering the same. A method of printing the conductive paste for an internal electrode may be a screen printing method, a gravure printing method or the like, and is not limited thereto.

An average thickness td of the dielectric layers 111 and an average thickness te of the internal electrodes 121 or 122 may not need to be particularly limited. The average thickness td of the dielectric layers 111 and the average thickness of the internal electrodes 121 or 122 may be set arbitrarily based on a desired feature or purpose. However, in order to achieve the miniaturization and high capacitance of the multilayer electronic component 100, the average thickness td of the dielectric layers 111 may be 0.4 μm or more and 0.8 μm or less, and the average thickness te of the internal electrodes 121 or 122 may be 0.3 μm or more and 0.65 μm or less. In general, a reliability feature of the multilayer electronic component 100, such as insulation resistance or breakdown voltage, may be lower as a thickness of the dielectric layer 111 or that of the internal electrode 121 or 122 is smaller. However, the reliability of the multilayer electronic component 100 according to an exemplary embodiment of the present disclosure may be secured by the external electrode 131 or 132 of the multilayer electronic component 100 that has a multilayer structure described below even when the average thickness td of the dielectric layers 111 and the average thickness te of the internal electrodes 121 or 122 satisfy the above range.

The average thickness td of the dielectric layers 111 and the average thickness te of the internal electrodes 121 or 122 may respectively indicate average sizes of the dielectric layers 111 and the internal electrodes 121 or 122 in the first direction. The average thickness td of the dielectric layers 111 and the average thickness te of the internal electrodes 121 or 122 may be measured by scanning a cross section of the body 110 in a first direction and a second direction by using the scanning electron microscope (SEM) at 10,000 magnification. In more detail, the average thickness td of the dielectric layers 111 may be acquired by measuring the thicknesses of the dielectric layer 111 at a plurality of points, for example, at thirty equally spaced points in the second direction, and then taking their average value. In addition, the average thickness te of the internal electrodes 121 or 122 may be acquired by measuring the thicknesses of the internal electrode 121 or 122 at a plurality of points, for example, at thirty equally spaced points in the second direction, and then taking their average value. The thirty equally spaced points may be specified in a capacitance formation portion Ac. Meanwhile, it is possible to acquire the more general average thickness td of the dielectric layers 111 and the more general average thickness te of the internal electrodes 121 or 122 when measuring each average value by extending a measurement target of the average value to ten dielectric layers 111 or ten internal electrodes 121 or 122.

The body 110 may include the capacitance formation portion Ac disposed in the body 110 and forming capacitance by including the first and second internal electrodes 121 and 122 alternately disposed while having the dielectric layer 111 interposed therebetween, and a first cover portion 112 and a second cover portion 113 disposed on both surfaces of the capacitance formation portion Ac that oppose each other in the first direction. The cover portion 112 or 113 may basically serve to prevent damage to the internal electrode that is caused by a physical or chemical stress. The cover portion 112 or 113 may have a configuration similar to that of the dielectric layer 111 except that the cover portion includes no internal electrode. The cover portions 112 and 113 may be formed by stacking a predetermined number of ceramic green sheets on each of which an internal electrode pattern is not printed on both the surfaces of the capacitance formation portion Ac that oppose each other in the first direction, and then sintering the same.

An average thickness tc of the cover portions 112 or 113 may not need to be particularly limited. In order to achieve the miniaturization and high capacitance of the multilayer electronic component 100, the average thickness tc of the cover portions 112 or 113 may be 30 μm or less, and is not limited thereto. In an exemplary embodiment of the present disclosure, the reliability of the multilayer electronic component 100 may be secured by the external electrode 131 or 132 having the multilayer structure described below even when the average thickness tc of the cover portions 113 or 112 is 30 μm or less. Here, the average thickness tc of the cover portions 112 or 113 may indicate an average thickness of each of the first cover portion 112 and the second cover portion 113.

The average thickness tc of the cover portions 112 or 113 may indicate an average size of the cover portions 112 or 113 in the first direction, and may be an average value of their sizes in the first direction that are measured at five points equally spaced in the second direction in the cross section of the body 110 in the first direction and the second direction, passing through a center of the body 110 in the third direction.

The body 110 may include a first margin portion 114 and a second margin portion 115 respectively disposed on both surfaces of the capacitance formation portion Ac that oppose each other in the third direction. That is, the margin portion 114 or 115 may indicate a region between each end of the internal electrode 121 or 122 and a boundary surface of the body 110 in a cross section of the body 110 that is cut in a first direction and a third direction.

The margin portion 114 or 115 may have a configuration similar to that of the dielectric layer 111 except that the margin portion includes no internal electrode. The margin portion 114 or 115 may basically serve to prevent the internal electrode from being damaged due to the physical or chemical stress.

The margin portion 114 or 115 may be formed by applying the conductive paste for an internal electrode on the ceramic green sheet and sintering the same, except for a region where the margin portion is to be formed. Alternatively, in order to suppress a step caused by the internal electrode 121 or 122, the margin portion 114 or 115 may be formed by cutting the stacked internal electrodes 121 and 122 to be exposed through the fifth and sixth surfaces 5 and 6 of the body, and then stacking one dielectric layer or two or more dielectric layers on both the surfaces of the capacitance formation portion Ac that oppose each other in the third direction.

An average thickness tm of the margin portion 114 or 115 may not need to be particularly limited. In order to achieve the miniaturization and high capacitance of the multilayer electronic component 100, the average thickness tm of the margin portions 114 or 115 may be 30 μm or less, and is not limited thereto. In an exemplary embodiment of the present disclosure, the reliability of the multilayer electronic component 100 may be secured by the external electrodes 131 and 132 having the multilayer structure described below even when the average thickness tm of the margin portions 114 or 115 is 30 μm or less. Here, the average thickness tm of the margin portions 114 or 115 may indicate an average thickness of each of the first margin portion 114 and the second margin portion 115.

The average thickness tm of the margin portions 114 or 115 may indicate an average size of the margin portions 114 or 115 in the third direction, and may be an average value of their sizes in the third direction that are measured at five points equally spaced in the first direction in the cross section of the body 110 in the first direction and the third direction, passing through the center of the body 110 in the second direction.

The external electrodes 131 and 132 may respectively be disposed on the third and fourth surfaces 3 and 4 of the body 110, and extend to some of the first, second, fifth and sixth surfaces 1, 2, 5, and 6. The external electrodes 131 and 132 may include the first external electrode 131 connected to the first internal electrode 121 and the second external electrode 132 connected to the second internal electrode 122.

The external electrode 131 or 132 may include a lower electrode layer **131*a* or 132*a* in contact with the internal electrode 121 or 122, an intermediate electrode layer 131*b* or 132*b* disposed on the lower electrode layer 131*a* or 132*a*, and an upper electrode layer 131*c* or 132*c* disposed on the intermediate electrode layer 131*b* or 132*b*. The first external electrode 131 may include the first lower electrode layer 131*a* disposed on the third surface 3 and extending to portions of the first and second surfaces 1 and 2, the first intermediate electrode layer 131*b* covering the first lower electrode layer 131*a*, and the first upper electrode layer 131*c* covering the first intermediate electrode layer 131*b*. The second external electrode 132 may include the second lower electrode layer 132*a* disposed on the fourth surface 4 and extending to portions of the first and second surfaces 1 and 2, the second intermediate electrode layer 132*b* covering the second lower electrode layer 132*a*, and the second upper electrode layer 132*c* covering the second intermediate electrode layer 132*b***.

Each of the lower electrode layer 131a or 132a, the intermediate electrode layer 131b or 132b, and the upper electrode layer 131c or 132c may also partially extend to the fifth and sixth surfaces 5 and 6.

The lower electrode layer 131a or 132a may include copper (Cu) and glass. In particular, the lower electrode layer 131a or 132a may include copper (Cu) as its main component. For example, a ratio of an area occupied by copper (Cu) to a total area of the lower electrode layer 131a or 132a may be 80% or more when analyzing a cross section of the multilayer electronic component 100 in the first direction and the second direction, passing through the center of the multilayer electronic component 100 in the third direction, by using the scanning electron microscopy (SEM) and energy dispersive spectroscopy (EDS). For example, the ratio of the area occupied by copper (Cu) to the total area of the lower electrode layer 131a or 132a may be greater than a ratio of an area occupied by an element other than copper (Cu) to the total area of the lower electrode layer 131a or 132a, in the cross section of the multilayer electronic component 100 in the first direction and the second direction, passing through the center of the multilayer electronic component 100 in the third direction. Here, the total area of the lower electrode layer 131a or 132a may indicate the total area occupied by the lower electrode layer 131a or 132a in an image analyzed by the SEM-EDS. The image may be an image illustrating the entire lower electrode layer 131a or 132a, or may be an enlarged image of a portion of the lower electrode layer 131a or 132a.

The lower electrode layer 131a or 132a may basically serve to electrically connect the internal electrode 121 or 122 to the external electrode 131 or 132. The lower electrode layer 131a or 132a may be formed by dipping the third or fourth surface 3 or 4 of the body 110 into a conductive paste for a lower electrode layer that includes a copper (Cu) powder, glass, the binder, the organic solvent, or the like, and then sintering the conductive paste for a lower electrode layer.

The intermediate electrode layer 131b or 132b may include copper (Cu). In particular, the intermediate electrode layer 131b or 132b may include copper (Cu) as its main component. For example, a content (at %) of Cu in a total content (at %) of elements included in the intermediate electrode layer 131b or 132b may be 99 at % or more. For example, the content (at %) of Cu with respect to the total content (at %) of elements included in the intermediate electrode layer 131b or 132b may be determined by the scanning electron microscopy (SEM) and energy dispersive spectroscopy (EDS). In some example embodiments, a ratio of an area occupied by copper (Cu) to a total area of the intermediate electrode layer 131b or 132b may be 99% or more when analyzing the cross section of the multilayer electronic component 100 in the first direction and the second direction, passing through the center of the multilayer electronic component 100 in the third direction, by using the scanning electron microscopy (SEM) and energy dispersive spectroscopy (EDS). Other methods and/or tools appreciated by one of ordinary skill in the art, even if not described in the present disclosure, may also be used. The total area of the intermediate electrode layer 131b or 132b may indicate the total area occupied by the intermediate electrode layer 131b or 132b in the image analyzed by the SEM-EDS. The image may be an image illustrating the entire intermediate electrode layer 131b or 132b, or may be an enlarged image of a portion of the intermediate electrode layer 131b or 132b.

The intermediate electrode layer 131b or 132b may be formed using an electrolytic plating method, an electroless plating method, an atomic layer deposition (ALD) method, a chemical vapor deposition (CVD) method, and/or a sputtering method. For example, the intermediate electrode layer 131b or 132b may be a plating layer. For example, the intermediate electrode layer 131b or 132b may be a sputtering layer. Unlike the lower electrode layer 131a or 132a formed by sintering the conductive paste, the intermediate electrode layer 131b or 132b may be formed using the plating method or the sputtering method, and thus be denser than the lower electrode layer 131a or 132a. In addition, an outer surface of the intermediate electrode layer 131b or 132b may be smoother than that of the lower electrode layer 131a or 132a.

The upper electrode layer 131c or 132c may include silver (Ag) and glass. In particular, the upper electrode layer 131c or 132c may include silver (Ag) as its main component. For example, a ratio of an area occupied by silver (Ag) to a total area of the upper electrode layer 131c or 132c may be 80% or more when analyzing the cross section of the multilayer electronic component 100 in the first direction and the second direction, passing through the center of the multilayer electronic component 100 in the third direction, by using the scanning electron microscopy (SEM) and energy dispersive spectroscopy (EDS). For example, the ratio of the area occupied by silver (Ag) to the total area of the upper electrode layer 131c or 132c may be greater than a ratio of an area occupied by an element other than silver (Ag) to the total area of the upper electrode layer 131c or 132c, in the cross section of the multilayer electronic component 100 in the first direction and the second direction, passing through the center of the multilayer electronic component 100 in the third direction. Here, the total area of the upper electrode layer 131c or 132c may indicate the total area occupied by the upper electrode layer 131c or 132c in the image analyzed by the SEM-EDS. The image may be an image illustrating the entire upper electrode layer 131c or 132c, or may be an enlarged image of a portion of the upper electrode layer 131c or 132c.

A method of forming the upper electrode layer 131c or 132c may not need to be particularly limited. For example, the upper electrode layer 131c or 132c may be formed by dipping the body 110, on which the intermediate electrode layer 131b or 132b is formed, into a conductive paste for an upper electrode layer including a silver (Ag) powder, glass, the binder, the organic solvent, or the like, and then sintering the same. Alternatively, in order to achieve the thin external electrode 131 or 132, the upper electrode layer 131c or 132c may be formed by printing the conductive paste for an upper electrode layer on the intermediate electrode layer 131b or 132b by using the screen printing method and then sintering the same, or attaching a conductive sheet including the silver (Ag) powder, glass, the binder, or the like to the intermediate electrode layer 131b or 132b and then sintering the same. A sintering process to form the upper electrode layer 131c or 132c may be performed at a temperature of 300° C. or more and 800° C. or less, and is not limited thereto.

The external electrode 131 or 132 may include an alloy layer 131d or 132d including a copper (Cu)-silver (Ag) alloy and disposed between the intermediate electrode layer 131b or 132b and the upper electrode layer 131c or 132c. That is, the first external electrode 131 may include the first alloy layer 131d disposed between the first intermediate electrode layer 131b and the first upper electrode layer 131c, and the second external electrode 132 may include the second alloy layer 132d disposed between the second intermediate electrode layer 132*b* and the second upper electrode layer 132*c*. The alloy layer 131*d* or 132*d* may be formed by a mutual reaction between copper (Cu) in the intermediate electrode layer 131*b* or 132*b* and silver (Ag) in the upper electrode layer 131*c* or 132*c* when the upper electrode layer 131*c* or 132*c* is formed by sintering the conductive paste. The Cu—Ag alloy included in the alloy layer 131*d* or 132*d* may include oxygen (O). The alloy layer 131*d* or 132*d* may have a higher density than the lower electrode layer 131*a* or 132*a* or the upper electrode layer 131*c* or 132*c*, thus effectively preventing external moisture or plating solution from penetrating into the body 110.

Hereinafter, the description describes the external electrode 131 in more detail with reference to FIG. 5. FIG. 5 shows an enlarged portion of the first external electrode 131. However, the first external electrode 131 and the second external electrode 132 have substantially the same configuration except that the first external electrode 131 is connected to the first the internal electrode 121 and the second external electrode 132 is connected to the second the internal electrode 122. Therefore, the description of FIG. 5 below is considered to include descriptions of both the first and second external electrodes.

Referring to FIG. 5, a first metal M1 included in the lower electrode layer 131*a* may include copper (Cu) as its main component, and may not include silver (Ag). Meanwhile, copper (Cu) may be detected in the first metal M1, and silver (Ag) may not be detected therein when performing the analysis thereon by using the energy dispersive spectroscopy (EDS). A glass G1 included in the lower electrode layer 131*a* or 132*a* may include one or more oxides of barium (Ba), calcium (Ca), zinc (Zn), aluminum (Al), boron (B), and silicon (Si), and is not limited thereto.

A second metal M2 included in the intermediate electrode layer 131*b* may be substantially made of copper (Cu), and may not include silver (Ag). That is, copper (Cu) may be detected in the second metal M2, and silver (Ag) may not be detected therein when performing the analysis thereon by using the energy dispersive spectroscopy (EDS). In addition, the intermediate electrode layer 131*b* may include no glass.

A third metal M3 included in the upper electrode layer 131*c* may include silver (Ag) as its main component, and may not include copper (Cu). That is, silver (Ag) may be detected in the third metal M3, and copper (Cu) may not be detected therein when performing the analysis thereon by using the energy dispersive spectroscopy (EDS). Glass G3 included in the upper electrode layer 131*c* may include one or more oxides of barium (Ba), calcium (Ca), zinc (Zn), aluminum (Al), boron (B), and silicon (Si), and is not limited thereto.

A fourth metal M4 included in the alloy layer 131*d* may be the Cu—Ag alloy. That is, copper (Cu) and silver (Ag) may be detected together in the fourth metal M4 when performing the analysis thereon by using the energy dispersive spectroscopy (EDS).

According to an exemplary embodiment of the present disclosure, an area fraction occupied by a pore P2 of the intermediate electrode layer 131*b* may be smaller than an area fraction occupied by a pore P1 of the lower electrode layer 131*a*. The lower electrode layer 131*a* may include the plurality of pores P1 therein when formed by sintering the conductive paste. The pore may be a path through which the external moisture penetrates into the body 110. Therefore, the external moisture may easily penetrate into the body 110 through the pore P1 of the lower electrode layer 131*a*, thereby lowering the reliability of multilayer electronic component when the external electrode 131 does not include the intermediate electrode layer 131*b*.

However, according to an exemplary embodiment of the present disclosure, the intermediate electrode layer 131*b*, which is formed using the plating method or the sputtering method to thus have a higher density than the lower electrode layer 131*a*, may be disposed on the lower electrode layer 131*a*, thereby effectively preventing the external moisture from penetrating into the body 110. In an exemplary embodiment, the area fraction occupied by the pore P2 of the intermediate electrode layer 131*b* may be 0.5% or less. The moisture resistance reliability of the present disclosure may be more significantly improved when the area fraction occupied by the pore P2 of the intermediate electrode layer 131*b* is 0.5% or less.

In an exemplary embodiment, an area fraction occupied by a pore P4 of the alloy layer 131*d* may be smaller than an area fraction occupied by a pore in the upper electrode layer 131*c*. The upper electrode layer 131*c* may include a number of pores P3 therein when the upper electrode layer 131*c* is formed by sintering the conductive paste. The Cu—Ag alloy layer may be formed by a reaction between the copper (Cu) in the lower electrode layer 131*a* and silver (Ag) in the upper electrode layer 131*c* when the external electrode 131 does not include the intermediate electrode layer 131*b*. Even in this case, the Cu—Ag alloy layer may be formed by the reaction between the lower electrode layer 131*a* and the upper electrode layer 131*c*, each including a number of pores, to thus have a discontinuous form while having a number of pores formed therein. In this case, it is impossible to effectively suppress the external moisture penetration.

On the other hand, in an exemplary embodiment of the present disclosure, the alloy layer 131*d* may be formed by a reaction between the upper electrode layer 131*c* and the intermediate electrode layer 131*b*, which has the higher density than the lower electrode layer 131*a*, to thus have the higher density than the upper electrode layer 131*c*. In an exemplary embodiment, an average size of the pores P4 included in the alloy layer 131*d* may be smaller than an average size of the pores P3 included in the upper electrode layer 131*c*.

In addition, the alloy layer 131*d* may be formed between the upper electrode layer 131*c* and the intermediate electrode layer 131*b*, which has a smooth outer surface and the higher density than the lower electrode layer 131*a* to thus have continuous form and be disposed at an interface between the intermediate electrode layer 131*b* and the upper electrode layer 131*c*. That is, the dense and continuous alloy layer 131*d* may be formed by the intermediate electrode layer 131*b*, and the alloy layer 131*d* may effectively suppress the external moisture penetration. In an exemplary embodiment, a ratio of a length of a region where the alloy layer 131*d* is disposed to a total length of the interface between the intermediate electrode layer 131*b* and the upper electrode layer 131*c* may be 99% or more, in the cross section of the body 110 in the first direction and the second direction, passing through the center of the body 110 in the third direction. The lengths and ratio may be measured using a scanning electron microscope (SEM) and an image analysis program. Other methods and/or tools appreciated by one of ordinary skill in the art, even if not described in the present disclosure, may also be used.

The description describes an example of a method for measuring the area fractions of the pores P1, P2, P3, and P4 respectively included in the lower electrode layer 131*a*, the intermediate electrode layer 131*b*, the upper electrode layer 131*c*, and the alloy layer 131*d*. First, an enlarged image of an external electrode region in the cross section of the body 110 in the first direction and the second direction, passing through the center of the body 110 in the third direction may be acquired using the scanning electron microscope (SEM). The external electrode region may indicate a central region of the external electrode in the first direction. Next, the image may be analyzed using an image analysis program, such as ImageJ program. In the image, the pores P1, P2, P3, and P4 may be displayed in black, and an area of the pore included in each electrode layer may thus be measured using the image program. Accordingly, it is possible to measure a ratio of an area of the pore P1 to a total area of the lower electrode layer 131*a*, a ratio of an area of the pore P2 to a total area of the intermediate electrode layer 131*b*, a ratio of an area of the pore P3 to a total area of the upper electrode layer 131*c*, and a ratio of an area of the pore P4 to a total area of the alloy layer 131*d*. Other methods and/or tools appreciated by one of ordinary skill in the art, even if not described in the present disclosure, may also be used.

The average sizes of the pores in the upper electrode layer 131*c* and in the alloy layer 131*d* may be measured using a scanning electron microscope (SEM) and an image analysis program. Other methods and/or tools appreciated by one of ordinary skill in the art, even if not described in the present disclosure, may also be used.

In an exemplary embodiment, t1>t3>t2 where t1 indicates a thickness of a central region of the lower electrode layer 131*a* in the first direction, t2 indicates a thickness of a central region of the intermediate electrode layer 131*b* in the first direction, and t3 indicates a thickness of a central region of the upper electrode layer 131*c* in the first direction, in the cross section of the body 110 in the first direction and the second direction, passing through the center of the body 110 in the third direction. In addition, t1>t3>t2>t4 where t4 indicates a thickness of a central region of the alloy layer 131*d* in the first direction, in the cross section of the body 110 in the first direction and the second direction, passing through the center of the body 110 in the third direction.

t1 to t4 may not need to be particularly limited. t1 may be 5 μm to 25 μm, t2 may be 2 μm to 4 μm, t3 may be 1 μm to 2 μm, and t4 may be less than 1 μm. t1 to t4 may be measured using a scanning electron microscope (SEM) and an image analysis program. Other methods and/or tools appreciated by one of ordinary skill in the art, even if not described in the present disclosure, may also be used.

Meanwhile, although not shown, the external electrode 131 or 132 may further include an external plating layer disposed on the upper electrode layer 131*c* or 132*c*. A type of the external plating layer is not particularly limited, and may be a plating layer including nickel (Ni), tin (Sn), palladium (Pd), and/or an alloy including the same, and may include a plurality of layers. The external plating layer may be, for example, a nickel (Ni) plating layer or a tin (Sn) plating layer, and may have the sequentially-formed Ni plating layer and Sn plating layer. In addition, the external plating layer may include the plurality of Ni plating layers and/or the plurality of Sn plating layers.

The description describes a structure of the multilayer electronic component 100 having two external electrodes 131 and 132, the structure is not limited thereto, and the number or shape of the external electrodes 131 and 132 may be changed based on the shape or form of the internal electrode 121 or 122 or another purpose.

Figure 6:
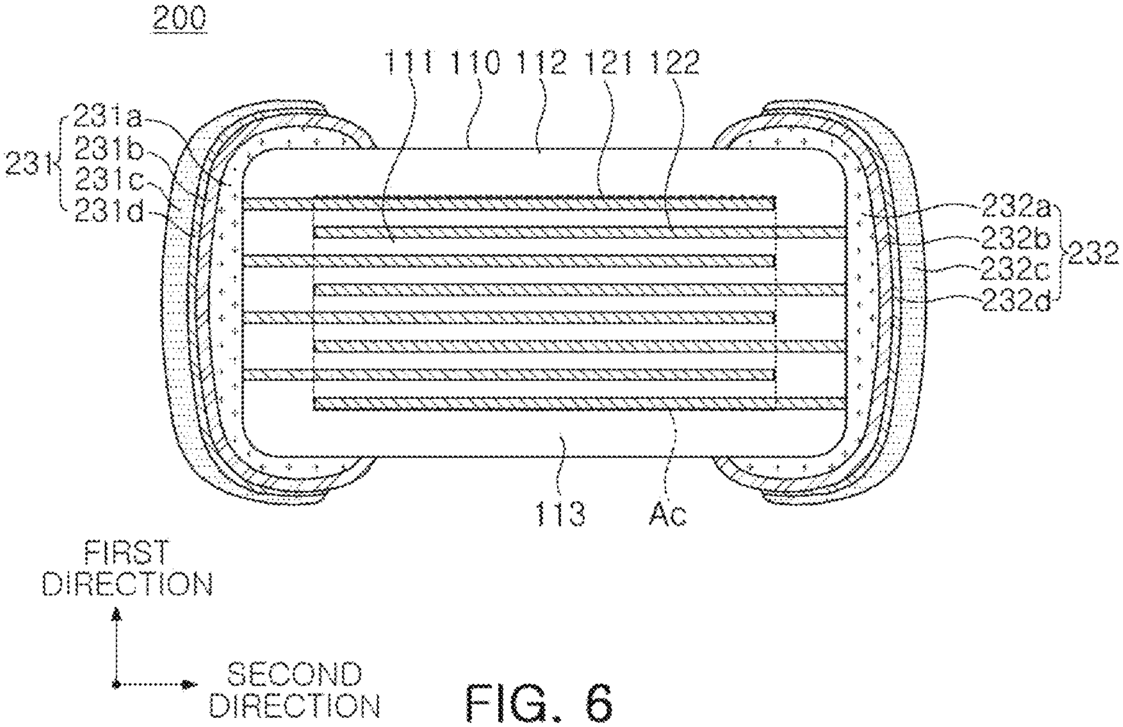
FIG. 6 is a modified example of the example embodiment illustrated in FIG. 3, and is a cross-sectional view schematically illustrating a multilayer electronic component according to another exemplary embodiment of the present disclosure.

FIG. 6 is a modified example of the example embodiment illustrated in FIG. 3, and is a cross-sectional view schematically illustrating a multilayer electronic component 200 according to another exemplary embodiment of the present disclosure. Hereinafter, the description describes the multilayer electronic component 200 according to another exemplary embodiment of the present disclosure with reference to FIG. 6, and omits its description overlapping that of the multilayer electronic component 100 according to an exemplary embodiment of the present disclosure described above.

The multilayer electronic component 200 according to another exemplary embodiment of the present disclosure may include the body 110 and first and second external electrodes 231 and 232.

The first external electrode 231 may include a first lower electrode layer 231*a* disposed on the third surface 3 and extending to portions of the first and second surfaces 1 and 2, a first intermediate electrode layer 231*b* covering the first lower electrode layer 231*a*, and a first upper electrode layer 231*c* disposed on the first intermediate electrode layer 231*b*. The second external electrode 232 may include a second lower electrode layer 232*a* disposed on the fourth surface 4 and extending to portions of the first and second surfaces 1 and 2, a second intermediate electrode layer 232*b* covering the second lower electrode layer 232*a*, and a second upper electrode layer 232*c* disposed on the second intermediate electrode layer 232*b*.

The first external electrode 231 may include a first alloy layer 231*d* formed by a reaction between the first intermediate electrode layer 231*b* and the first upper electrode layer 231*c*, and the second external electrode 232 may include a second alloy layer 232*d* formed by a reaction between the second intermediate electrode layer 232*b* and the second upper electrode layer 232*c*.

In the multilayer electronic component 200 according to an exemplary embodiment of the present disclosure, an end of the first intermediate electrode layer 231*b* may not be covered by the first upper electrode layer 231*c*, and an end of the second intermediate electrode layer 232*b* may not be covered by the second upper electrode layer 232*c*.

In order to achieve the thin external electrode 231 or 232, an end of the intermediate electrode layer 231*b* or 232*b* may not be covered by the upper electrode layer 231*c* or 232*c* when forming the upper electrode layer 231*c* or 232*c* by printing the conductive paste for an upper electrode layer on the intermediate electrode layer 231*b* or 232*b* by using the screen printing method and then sintering the same, or attaching the conductive sheet to the intermediate electrode layer 231*b* or 232*b* and then sintering the same. Accordingly, the alloy layer 231*d* or 232*d* may not be formed on the end of the intermediate electrode layer 231*b* or 232*b*. In this case, it is possible to improve the moisture resistance reliability of the multilayer electronic component 200 by using the alloy layer 231*d* or 232*d* including the Cu—Ag alloy, while achieving the thin external electrode 231 or 232.

Figure 7:
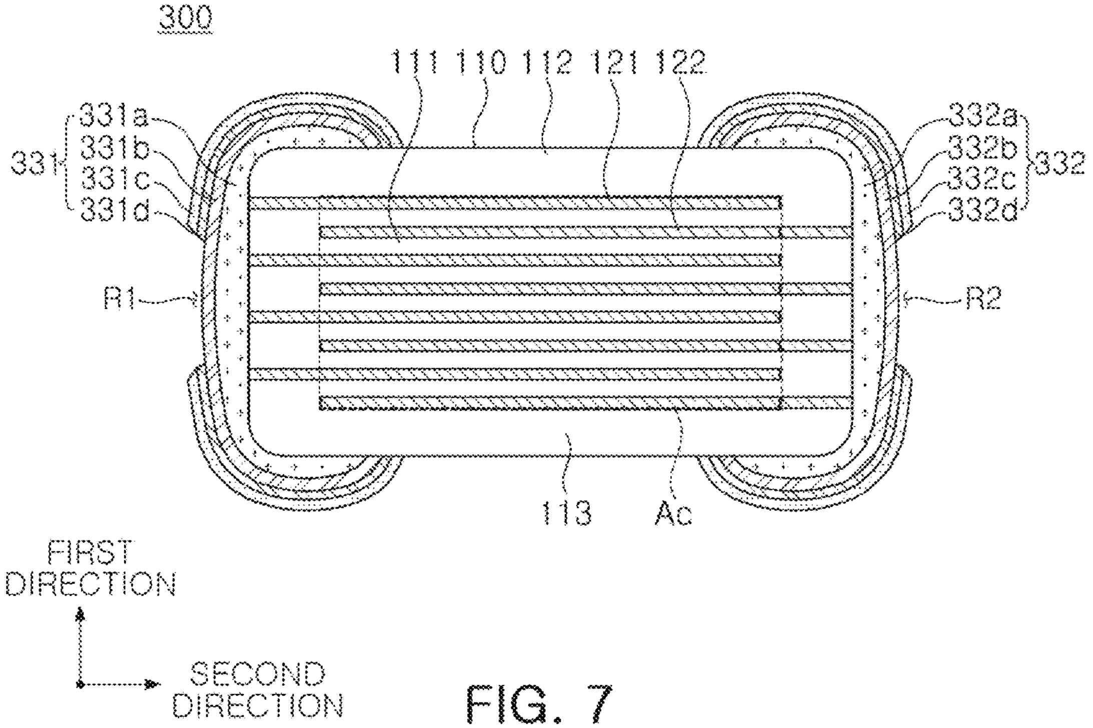
FIG. 7 is a modified example of the example embodiment illustrated in FIG. 3, and is a cross-sectional view schematically illustrating a multilayer electronic component according to another exemplary embodiment of the present disclosure.

FIG. 7 is a modified example of the example embodiment illustrated in FIG. 3, and is a cross-sectional view schematically illustrating a multilayer electronic component 300 according to another exemplary embodiment of the present disclosure. Hereinafter, the description describes the multilayer electronic component 300 according to another exemplary embodiment of the present disclosure with reference to FIG. 7, and omits its description overlapping that of the multilayer electronic component 100 according to an exemplary embodiment of the present disclosure described above.

The multilayer electronic component 300 according to another exemplary embodiment of the present disclosure may include the body 110 and first and second external electrodes 331 and 332.

The first external electrode 331 may include a first lower electrode layer 331*a* disposed on the third surface 3 and extending to portions of the first and second surfaces 1 and 2, a first intermediate electrode layer 331*b* covering the first lower electrode layer 331*a*, and a first upper electrode layer 331*c* disposed on the first intermediate electrode layer 331*b*. The second external electrode 332 may include a second lower electrode layer 332*a* disposed on the fourth surface 4 and extending to portions of the first and second surfaces 1 and 2, a second intermediate electrode layer 332*b* covering the second lower electrode layer 332*a*, and a second upper electrode layer 332*c* disposed on the second intermediate electrode layer 332*b*.

The first external electrode 331 may include a first alloy layer 331*d* formed by a reaction between the first intermediate electrode layer 331*b* and the first upper electrode layer 331*c*, and the second external electrode 332 may include a second alloy layer 332*d* formed by a reaction between the second intermediate electrode layer 332*b* and the second upper electrode layer 332*c*.

In the multilayer electronic component 300 according to an exemplary embodiment of the present disclosure, the first intermediate electrode layer 331*b* may include a first region R1, which is not covered by the first upper electrode layer 331*c*, on the third surface 3, and the second intermediate electrode layer 332*b* may include a second region R2, which is not covered by the second upper electrode layer 332*c*, on the fourth surface 4.

Accordingly, the first alloy layer 331*d* may not be formed on the first region R1, and the second alloy layer 332*d* may not be formed on the second region R2. In this case, the moisture resistance reliability of the multilayer electronic component 300 may be improved using the alloy layer 331*d* or 332*d* including the Cu—Ag alloy, and an electrical feature of the multilayer electronic component 300 may be improved using the intermediate electrode layer 331*b* or 332*b* in direct contact with the external plating layer through the first region R1 and the second region R2.

Figure 8:
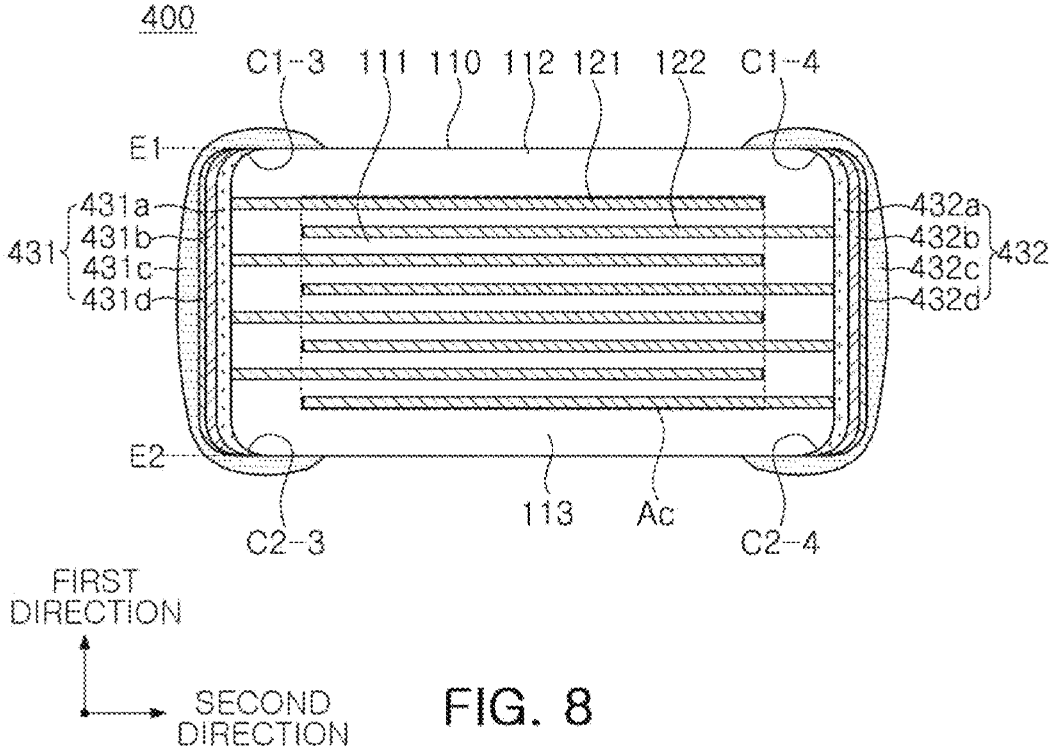
FIG. 8 is a modified example of the example embodiment illustrated in FIG. 3, and is a cross-sectional view schematically illustrating a multilayer electronic component according to another exemplary embodiment of the present disclosure.

FIG. 8 is a modified example of the example embodiment illustrated in FIG. 3, and is a cross-sectional view schematically illustrating a multilayer electronic component 400 according to another exemplary embodiment of the present disclosure. Hereinafter, the description describes the multilayer electronic component 400 according to another exemplary embodiment of the present disclosure with reference to FIG. 8, and omits its description overlapping that of the multilayer electronic component 100 according to an exemplary embodiment of the present disclosure described above.

The multilayer electronic component 400 according to another exemplary embodiment of the present disclosure may include the body 110 and first and second external electrodes 431 and 432.

The body 110 may have a 1-3-th corner C1-3 connecting the first surface and the third surface to each other, a 1-4-th corner C1-4 connecting the first surface and the fourth surface to each other, a 2-3-th corner C2-3 connecting the second surface and the third surface to each other, and a 2-4-th corner C2-4 connecting the second surface and the fourth surface to each other. In addition, the body 110 may have a 1-5-th corner connecting the first surface and the fifth surface to each other, a 1-6-th corner connecting the first surface and the sixth surface to each other, a 2-5-th corner connecting the second surface and the fifth surface to each other, and a 2-6-th corner connecting the second surface and the sixth surface to each other. The corner may have a round shape by rounding the corner connecting the respective surfaces of the body 110 to each other by performing a separate process. The first to sixth surfaces of the body 110 may generally be the flat surfaces, and the non-flat regions may be the corners.

The first external electrode 431 may include a first lower electrode layer 431*a* disposed on the third surface 3 and disposed between an extension line E1 of the first surface and an extension line E2 of the second surface, a first intermediate electrode layer 431*b* covering the first lower electrode layer 431*a*, and a first upper electrode layer 431*c* disposed on the first intermediate electrode layer 431*b* and extending to portions of the first and second surfaces 1 and 2. The second external electrode 432 may include a second lower electrode layer 432*a* disposed on the fourth surface 4 and disposed between the extension line E1 of the first surface and the extension line E2 of the second surface, a second intermediate electrode layer 432*b* covering the second lower electrode layer 432*a*, and a second upper electrode layer 432*c* disposed on the second intermediate electrode layer 432*b* and extending to portions of the first and second surfaces 1 and 2. The upper electrode layer 431*c* or 432*c* may partially extend to the fifth and sixth surfaces 5 and 6.

The first external electrode 431 may include a first alloy layer 431*d* formed by a reaction between the first intermediate electrode layer 431*b* and the first upper electrode layer 431*c*, and the second external electrode 432 may include a second alloy layer 432*d* formed by a reaction between the second intermediate electrode layer 432*b* and the second upper electrode layer 432*c*. The moisture resistance reliability of the multilayer electronic component 400 may be improved using the alloy layer 431*d* or 432*d* including the Cu—Ag alloy.

Meanwhile, the extension line of each surface may indicate a line extending from a flat portion of each surface. The first lower electrode layer 431*a* may be disposed between the extension line E1 of the first surface and the extension line E2 of the second surface, an end of the first lower electrode layer 431*a* may thus be disposed on the 1-3-th corner C1-3 and the 2-3-th corner C2-3, and is not limited thereto. The second lower electrode layer 432*a* may be disposed between the extension line E1 of the first surface and the extension line E2 of the second surface, an end of the second lower electrode layer 432*a* may thus be disposed on the 1-4-th corner C1-4 and the 2-4-th corner C2-4, and is not limited thereto.

Unlike the lower electrode layer 131*a* or 132*a* of the multilayer electronic component 100 described above, the lower electrode layer 431*a* or 432*a* of the multilayer electronic component 400 according to an exemplary embodiment of the present disclosure may be formed by attaching a conductive sheet including the copper (Cu) powder, glass, the binder, or the like to the third or fourth surface 3 or 4 of the body 110 and then firing the same.

As set forth above, according to the exemplary embodiments of the present disclosure, the multilayer electronic component may have the improved moisture resistance reliability.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:

a body including a dielectric layer and internal electrodes alternately disposed while having the dielectric layer interposed therebetween; and external electrodes disposed on the body, wherein the external electrodes include a lower electrode layer including copper (Cu) and glass, an intermediate electrode layer including copper (Cu) and disposed on the lower electrode layer, and an upper electrode layer including silver (Ag) and glass and disposed on the intermediate electrode layer, and an area fraction occupied by a pore in the intermediate electrode layer is smaller than an area fraction occupied by a pore in the lower electrode layer.

2. The component according to claim 1, wherein the area fraction occupied by the pore in the intermediate electrode layer is 0.5% or less.

3. The component according to claim 1, wherein the external electrodes further include an alloy layer including a copper (Cu)-silver (Ag) alloy and disposed between the intermediate electrode layer and the upper electrode layer.

4. The component according to claim 3, wherein an area fraction occupied by a pore in the alloy layer is smaller than an area fraction occupied by a pore in the upper electrode layer.

5. The component according to claim 3, wherein an average size of pores included in the alloy layer is smaller than an average size of pores included in the upper electrode layer.

6. The component according to claim 1, wherein the intermediate electrode layer is free of glass.

7. The component according to claim 1, wherein the lower electrode layer includes copper (Cu) as a main component, the intermediate electrode layer includes copper (Cu) as a main component, and the upper electrode layer includes silver (Ag) as a main component.

8. The component according to claim 7, wherein a content (at %) of copper (Cu) with respect to a total content (at %) of elements included in the intermediate electrode layer is 99 at % or more.

9. The component according to claim 1, wherein the intermediate electrode layer is a plating layer.

10. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes are respectively disposed on the third and fourth surfaces, and in a cross section of the body in the first direction and the second direction, and passing through a center of the body in the third direction, $t1>t3>t2$, where t1 indicates a thickness of a central region of the lower electrode layer in the first direction, t2 indicates a thickness of a central region of the intermediate electrode layer in the first direction, and t3 indicates a thickness of a central region of the upper electrode layer in the first direction.

11. The component according to claim 10, wherein the external electrodes further include an alloy layer including a copper (Cu)-silver (Ag) alloy and disposed between the intermediate electrode layer and the upper electrode layer, and in the cross section of the body in the first direction and the second direction, and passing through the center of the body in the third direction, $t1>t3>t2>t4$, where t4 indicates a thickness of a central region of the alloy layer in the first direction.

12. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode, the lower electrode layer of the first external electrode is disposed on the third surface and extends to portions of the first and second surfaces, the intermediate electrode layer of the first external electrode covers the lower electrode layer of the first external electrode, and the upper electrode layer of the first external electrode covers the intermediate electrode layer of the second external electrode, and the lower electrode layer of the second external electrode is disposed on the fourth surface and extends to portions of the first and second surfaces, the intermediate electrode layer of the second external electrode covers the lower electrode layer of the second external electrode, and the upper electrode layer of the second external electrode covers the intermediate electrode layer of the second external electrode.

13. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode, the lower electrode layer of the first external electrode is disposed on the third surface and extends to portions of the first and second surfaces, the intermediate electrode layer of the first external electrode covers the lower electrode layer of the first external electrode, and the upper electrode layer of the first external electrode is disposed on the intermediate electrode layer of the second external electrode, the lower electrode layer of the second external electrode is disposed on the fourth surface and extends to portions of the first and second surfaces, the intermediate electrode layer of the second external electrode covers the lower electrode layer of the second external electrode, and the upper electrode layer of the second external electrode is disposed on the intermediate electrode layer of the second external electrode, and an end of the intermediate electrode layer of the first external electrode is not covered by the upper electrode layer of the first external electrode, and an end of the intermediate electrode layer of the second external electrode is not covered by the upper electrode layer of the second external electrode.

14. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode, the lower electrode layer of the first external electrode is disposed on the third surface and extends to portions of the first and second surfaces, the intermediate electrode layer of the first external electrode covers the lower electrode layer of the first external electrode, and the upper electrode layer of the first external electrode is disposed on the intermediate electrode layer of the second external electrode, the lower electrode layer of the second external electrode is disposed on the fourth surface and extends to portions of the first and second surfaces, the intermediate electrode layer of the second external electrode covers the lower electrode layer of the second external electrode, and the upper electrode layer of the second external electrode is disposed on the intermediate electrode layer of the second external electrode, the intermediate electrode layer of the first external electrode includes a region, which is not covered by the upper electrode layer of the first external electrode, on the third surface, and the intermediate electrode layer of the second external electrode includes a region, which is not covered by the upper electrode layer of the second external electrode, on the fourth surface.

15. The component according to claim 1, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes includes a first external electrode and a second external electrode, the lower electrode layer of the first external electrode is disposed on the third surface and disposed between an extension line of the first surface and an extension line of the second surface, the intermediate electrode layer of the first external electrode covers the lower electrode layer of the first external electrode, and the upper electrode layer of the first external electrode is disposed on the intermediate electrode layer of the first external electrode and extends to portions of the first and second surfaces, and the lower electrode layer of the second external electrode is disposed on the fourth surface and disposed between the extension line of the first surface and the extension line of the second surface, the intermediate electrode layer of the second external electrode covers the lower electrode layer of the second external electrode, and the upper electrode layer of the second external electrode is disposed on the intermediate electrode layer of the second external electrode and extends to portions of the first and second surfaces.

16. A multilayer electronic component comprising:

a body including a dielectric layer and internal electrodes alternately disposed while having the dielectric layer interposed therebetween; and external electrodes disposed on the body, wherein the external electrodes include a lower electrode layer including copper (Cu) and glass, an intermediate electrode layer including copper (Cu) and disposed on the lower electrode layer, and an upper electrode layer including silver (Ag) and glass and disposed on the intermediate electrode layer, and the intermediate electrode layer is a plating layer or a sputtering layer.

17. The component according to claim 16, wherein an area fraction occupied by a pore in the intermediate electrode layer is 0.5% or less.

18. The component according to claim 16, wherein the external electrodes include an alloy layer including a copper (Cu)-silver (Ag) alloy and disposed between the intermediate electrode layer and the upper electrode layer.

19. The component according to claim 18, wherein an area fraction occupied by a pore in the alloy layer is smaller than an area fraction occupied by a pore in the upper electrode layer.

20. The component according to claim 18, wherein an average size of pores included in the alloy layer is smaller than an average size of pores included in the upper electrode layer.

21. The component according to claim 18, wherein, in a cross section of the body in the first direction and the second direction, and passing through a center of the body in the third direction, a ratio of a length of a region where the alloy layer is disposed to a total length of an interface between the intermediate electrode layer and the upper electrode layer is 99% or more.

22. The component according to claim 16, wherein the intermediate electrode layer is free of glass.

23. The component according to claim 16, wherein the lower electrode layer includes copper (Cu) as a main component, the intermediate electrode layer includes copper (Cu) as a main component, and the upper electrode layer includes silver (Ag) as a main component.

24. The component according to claim 23, wherein a content (at %) of copper (Cu) with respect to a total content (at %) of elements included in the intermediate electrode layer is 99 at % or more.

25. The component according to claim 16, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes are respectively disposed on the third and fourth surfaces, and in a cross section of the body in the first direction and the second direction, and passing through a center of the body in the third direction, $t1>t3>t2$, where $t1$ indicates a thickness of a central region of the lower electrode layer in the first direction, $t2$ indicates a thickness of a central region of the intermediate electrode layer in the first direction, and $t3$ indicates a thickness of a central region of the upper electrode layer in the first direction.

26. The component according to claim 25, wherein the external electrodes further include an alloy layer including a copper (Cu)-silver (Ag) alloy and disposed between the intermediate electrode layer and the upper electrode layer, and in the cross section of the body in the first direction and the second direction, and passing through the center of the body in the third direction, $t1>t3>t2>t4$, where $t4$ indicates a thickness of a central region of the alloy layer in the first direction.

27. The component according to claim 16, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode, the lower electrode layer of the first external electrode is disposed on the third surface and extends to portions of the first and second surfaces, the intermediate electrode layer of the first external electrode covers the lower electrode layer of the first external electrode, and the upper electrode layer of the first external electrode covers the intermediate electrode layer of the second external electrode, and the lower electrode layer of the second external electrode is disposed on the fourth surface and extends to portions of the first and second surfaces, the intermediate electrode layer of the second external electrode covers the lower electrode layer of the second external electrode, and the upper electrode layer of the second external electrode covers the intermediate electrode layer of the second external electrode.

28. The component according to claim 16, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode, the lower electrode layer of the first external electrode is disposed on the third surface and extends to portions of the first and second surfaces, the intermediate electrode layer of the first external electrode covers the lower electrode layer of the first external electrode, and the upper electrode layer of the first external electrode is disposed on the intermediate electrode layer of the second external electrode, the lower electrode layer of the second external electrode is disposed on the fourth surface and extends to portions of the first and second surfaces, the intermediate electrode layer of the second external electrode covers the lower electrode layer of the second external electrode, and the upper electrode layer of the second external electrode is disposed on the intermediate electrode layer of the second external electrode, and an end of the intermediate electrode layer of the first external electrode is not covered by the upper electrode layer of the first external electrode, and an end of the intermediate electrode layer of the second external electrode is not covered by the upper electrode layer of the second external electrode.

29. The component according to claim 16, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes include a first external electrode and a second external electrode, the lower electrode layer of the first external electrode is disposed on the third surface and extends to portions of the first and second surfaces, the intermediate electrode layer of the first external electrode covers the lower electrode layer of the first external electrode, and the upper electrode layer of the first external electrode is disposed on the intermediate electrode layer of the second external electrode, the lower electrode layer of the second external electrode is disposed on the fourth surface and extends to portions of the first and second surfaces, the intermediate electrode layer of the second external electrode covers the lower electrode layer of the second external electrode, and the upper electrode layer of the second external electrode is disposed on the intermediate electrode layer of the second external electrode, the intermediate electrode layer of the first external electrode includes a region, which is not covered by the upper electrode layer of the first external electrode, on the third surface, and the intermediate electrode layer of the second external electrode includes a region, which is not covered by the upper electrode layer of the second external electrode, on the fourth surface.

30. The component according to claim 16, wherein the body has first and second surfaces opposing each other in a first direction, third and fourth surfaces opposing each other in a second direction and connected to the first and second surfaces, and fifth and sixth surfaces opposing each other in a third direction and connected to the first to fourth surfaces, the external electrodes includes a first external electrode and a second external electrode, the lower electrode layer of the first external electrode is disposed on the third surface and disposed between an extension line of the first surface and an extension line of the second surface, the intermediate electrode layer of the first external electrode covers the lower electrode layer of the first external electrode, and the upper electrode layer of the first external electrode is disposed on the intermediate electrode layer of the first external electrode and extends to portions of the first and second surfaces, and the lower electrode layer of the second external electrode is disposed on the fourth surface and disposed between the extension line of the first surface and the extension line of the second surface, the intermediate electrode layer of the second external electrode covers the lower electrode layer of the second external electrode, and the upper electrode layer of the second external electrode is disposed on the intermediate electrode layer of the second external electrode and extends to portions of the first and second surfaces.

* * * * *